L. B. KINNARD.
AIR CYCLE.
APPLICATION FILED DEC. 7, 1920.
1,424,653.
Patented Aug. 1, 1922.
2 SHEETS—SHEET 1.
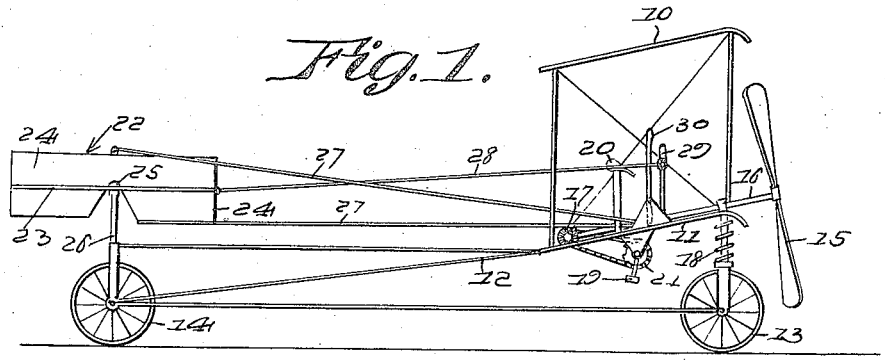
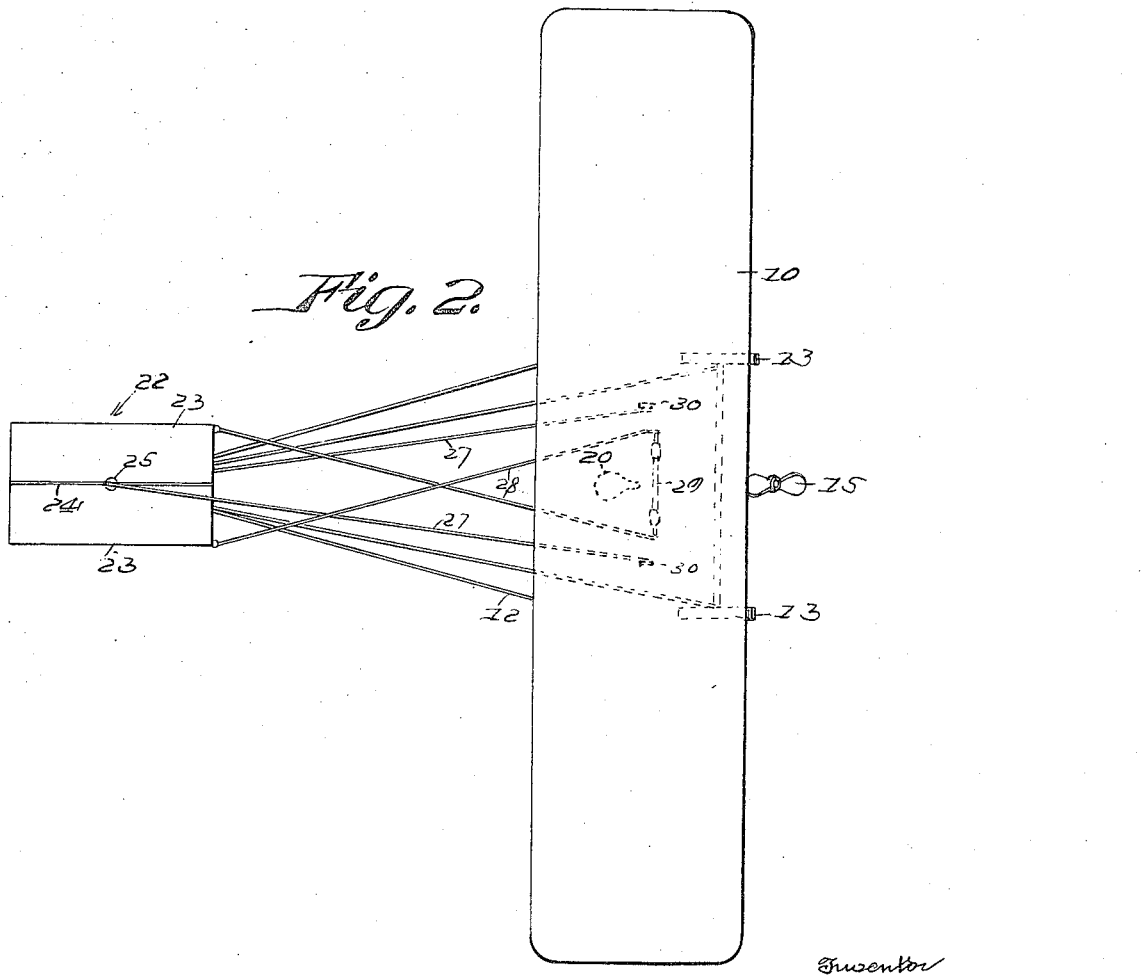
Inventor
L. B. Kinnard,
by G. Hume Talbert
Attorney

L. B. KINNARD.
AIR CYCLE.
APPLICATION FILED DEC. 7, 1920.

1,424,653.

Patented Aug. 1, 1922.
2 SHEETS—SHEET 2.

Inventor
L. B. Kinnard,
By
Attorney

UNITED STATES PATENT OFFICE.

LABAN B. KINNARD, OF JACKSONVILLE, TEXAS.

AIR CYCLE.

1,424,653.  Specification of Letters Patent.  Patented Aug. 1, 1922.

Application filed December 7, 1920. Serial No. 428,904.

*To all whom it may concern:*

Be it known that I, LABAN B. KINNARD, a citizen of the United States of America, residing at Jacksonville, in the county of Cherokee and State of Texas, have invented new and useful Improvements in Air Cycles, of which the following is a specification.

The object of the invention is to provide a vehicle of the aeroplane type which is adapted for operation by pedal power, variable in extent to suit the load or the number of proposed occupants by multiplying the driving pedals, and to provide in connection therewith improved means for controlling the direction of flight of the craft and simplifying the adjusting means used in that connection; and with this object in view the inventon consists in a construction and combination of parts of which a preferred embodiment is shown in the accompanying drawing, wherein:—

Figure 1 is a side view of an air craft embodying the invention.

Figure 2 is a plan view of the same.

Figure 3:
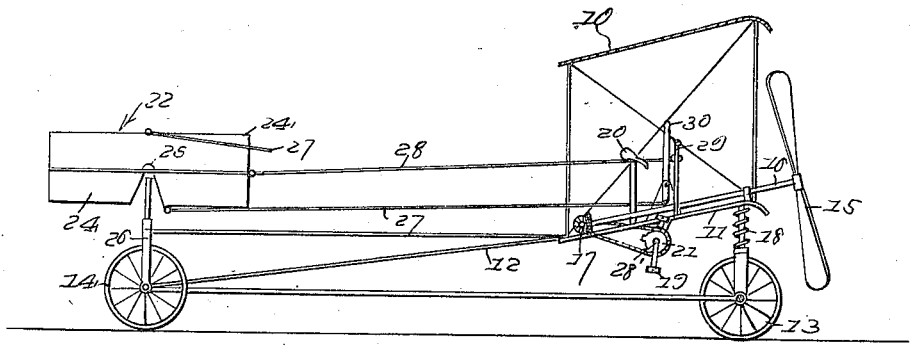
Figure 3 is a longitudinal section.
Figure 4:
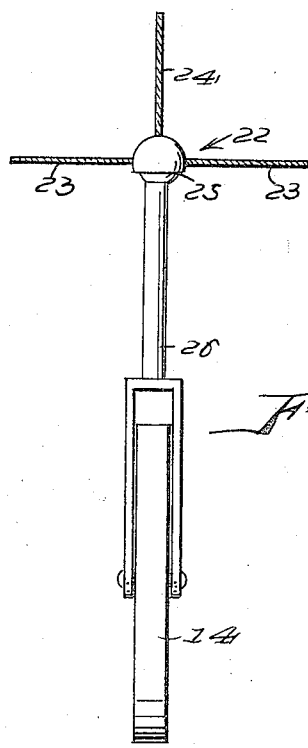
Figure 4 is a transverse section of the steering fan.

The planes 10 and 11 of which two are included in the illustrated embodiment of the invention, although it will be understood that the number is subject to modification as in the ordinary practice, are arranged in transversely extending relation with a frame 12 provided with laterally spaced front wheels 13 and a rear wheel 14, the propeller 15 having a rearwardly extending shaft 16 mounted in suitable bearings in the frame as indicated at 17. The spindles of the front wheels are preferably provided with cushioning springs 18 to relieve the jar in making a landing.

The driving pedals 19 of which one or more sets may be employed to correspond with the number of proposed occupants of the craft, are arranged within convenient reach of the driver's seat 20 and are operatively connected with the propeller shaft by speed multiplying gearing indicated at 21, it being understood that the gear ratio may be varied to suit the number of sets of driving pedals employed or may be varied to suit the number of occupants of the car, as in connection with other pedal driven vehicles, it being deemed unnecessary to specifically illustrate any particular form of such gearing inasmuch as the type thereof may be modified to suit the preference of the builder.

The steering fan 22 is formed with four blades of which two are vertically disposed and two horizontally disposed, the vertical blades alternating with the horizontal blades. The fan is universally mounted at an intermediate point in its length, as indicated at 25, upon an upstanding extension 26 of the spindle of the rear wheel 14. The vertically disposed blades are designed for lateral steering and in order that they may be swung on the universal connection 25, there are employed the rods 28 having terminal connections at their rear ends with the forward edges of the horizontal blades adjacent the corners, the rods crossing each other and being terminally connected to the extremities of a pivotally mounted handle bar 29. Obviously the turning of the handle bar in the direction it is desired the machine shall proceed will effect the necessary movement of the vertical blades of the fan to insure movement of the machine in the desired direction. The horizontally disposed blades, being designed for ascension and descension, are actuated by a rod 27 having a pivotal connection at its rear end with the upper of the vertical blades at the longitudinal center of the latter and also a pivotal connection at its forward end with the hand lever 30. It is obvious that in the operation of the device the driver while operating the pedals may employ both hands for use with the handle bar 29 and the lever 30 respectively to control lateral movement of the machine as well as vertical movement.

Having described the invention what is claimed as new and useful is:—

An air cycle having air planes and a propeller, a steering mechanism consisting of a fan provided with radially disposed blades of which two are vertical and two are horizontal, the fan being universally mounted at a point intermediate the length of the blades. and control means for the fans consisting of a pivotally mounted transversely disposed handle bar, crossing rods having terminal pivotal connections with the extremities of the handle bar and with the forward outer edges of the horizontal blades, a hand lever, and a rod connecting the hand lever with the upper of the vertical blades, the last said rod having a pivotal connection with the vertical blade at the upper edge of the latter at a point intermediate its length.

In testimony whereof he affixes his signature.

LABAN B. KINNARD.